United States Patent [19]

Hidock et al.

[11] Patent Number: 5,248,227
[45] Date of Patent: Sep. 28, 1993

[54] SYSTEM AND METHOD FOR TRANSPORTING AND HANDLING PHOSPHOROUS PENTASULFIDE

[75] Inventors: Michael A. Hidock, Parma; James J. Carter, North Olmsted, both of Ohio

[73] Assignee: The Lubrizol Corporation, Wickliffe, Ohio

[21] Appl. No.: 829,350

[22] Filed: Jan. 31, 1992

[51] Int. Cl.$^5$ ............................................... B60P 1/60
[52] U.S. Cl. ............................................ 406/41; 406/108; 406/119; 406/137
[58] Field of Search ................. 105/248; 406/39, 41, 406/108, 119, 127, 128, 131, 137, 145

[56] References Cited

U.S. PATENT DOCUMENTS

| | | | |
|---|---|---|---|
| 2,901,133 | 8/1959 | Weller | 406/119 |
| 4,140,349 | 2/1979 | Behnken | 406/39 |
| 4,677,917 | 7/1987 | Dugge et al. | 406/119 X |
| 4,823,989 | 4/1989 | Nilsson | 406/119 X |
| 5,018,910 | 5/1991 | Weiss | 406/108 X |

*Primary Examiner*—David M. Mitchell
*Assistant Examiner*—Andrew C. Pike
*Attorney, Agent, or Firm*—Forrest L. Collins; Frederick D. Hunter; James A. Cairns

[57] ABSTRACT

A system and method for transporting and handling in bulk by rail granular material and, in particular, phosphorous pentasulfide granules, is characterized by a hopper for containing the granular material in one or more hopper sections, and an outtake for each hopper section having a vertical leg connected to an outlet opening at the bottom of the hopper section and a horizontal leg into which material drops from the hopper through the bottom outlet opening and the vertical leg. A material conveying line connects the downstream end of the horizontal leg of the outtake or outtakes to a material discharge port through which the material is unloaded from the hopper. A conveying gas supply line connected to the material conveying line upstream of the horizontal leg of the outtake feeds a main flow stream of a conveying gas into the material conveying line for flow across the downstream end of the horizontal leg of the outtake, whereby granular material moving from the outtake into the material conveying line can become entrained in and conveyed by the main flow stream through the conveying line to the material discharge port. The system also comprises a feeder gas supply line connected to the horizontal leg of the outtake upstream of the vertical leg for feeding a stream of feeder gas into the horizontal leg for moving material from the vertical leg into the material conveying line. The system also includes a blaster arrangement and a unique infeed distributor.

17 Claims, 4 Drawing Sheets

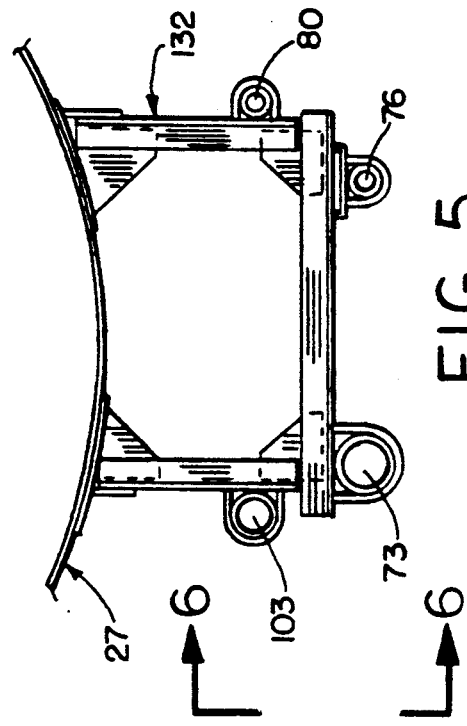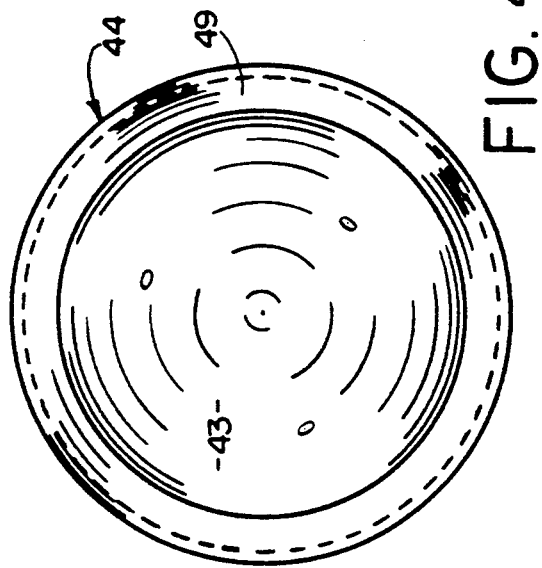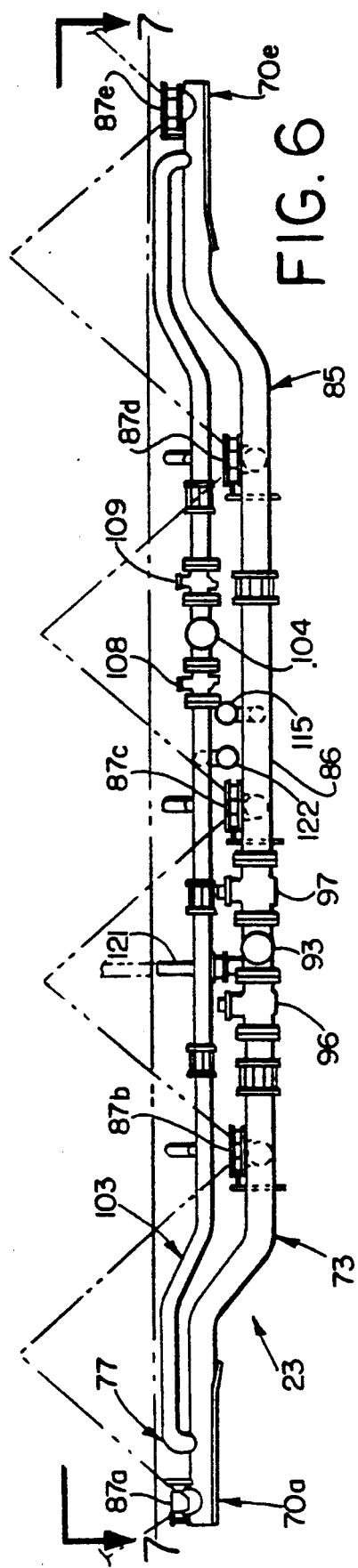

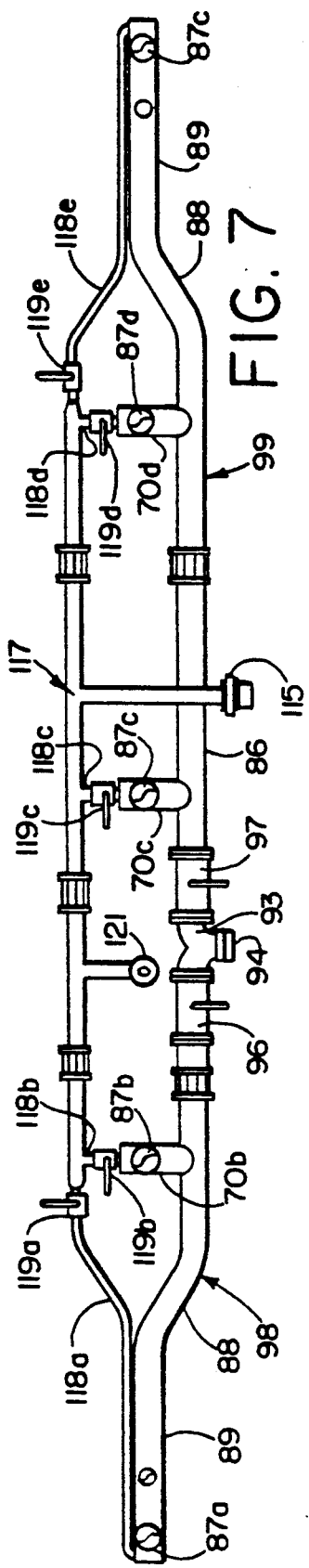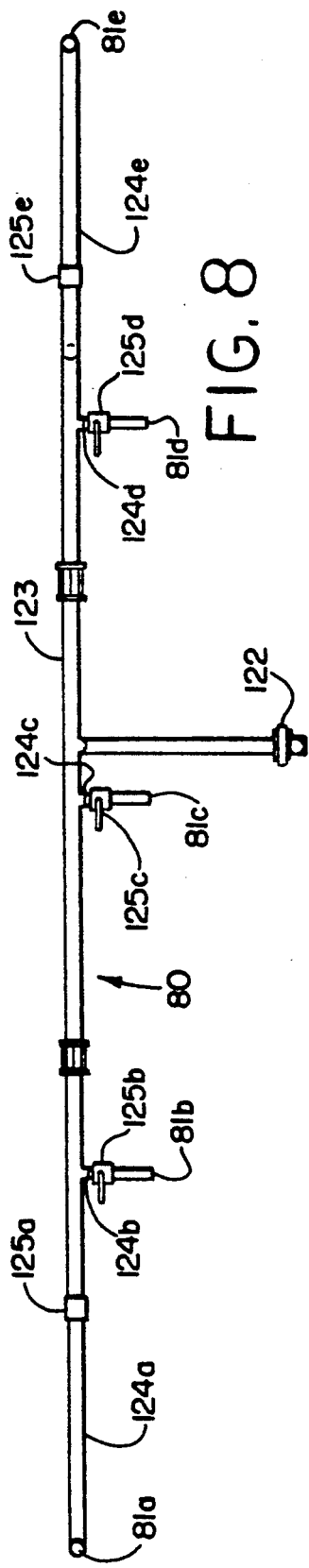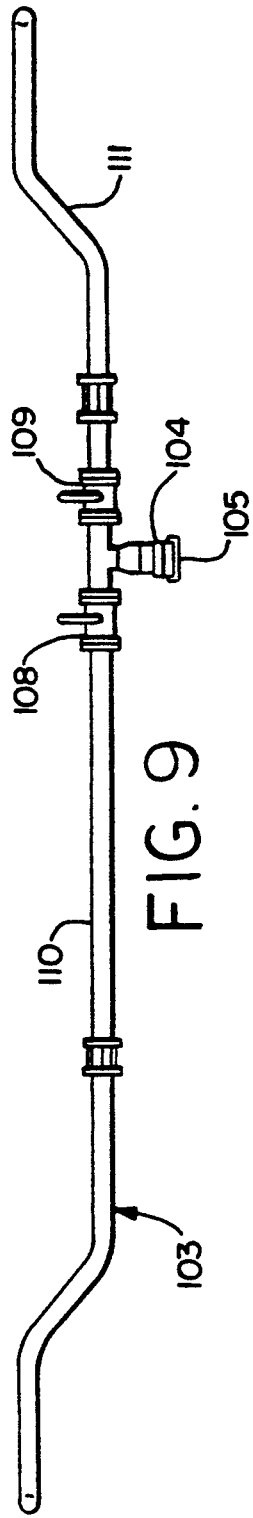

SYSTEM AND METHOD FOR TRANSPORTING AND HANDLING PHOSPHOROUS PENTASULFIDE

The invention herein described relates generally to the transporting and handling of granular materials and, more particularly, to a system and method for transporting and handling phosphorous pentasulfide granules.

BACKGROUND

Many materials are conveniently transported by rail or truck. However, the transporting and handling of hazardous materials in a safe and efficient manner is often a difficult task. One such material is phosphorous pentasulfide that is utilized as an intermediate in the manufacture of lubricant additives and pesticides. Phosphorous pentasulfide upon contact with water decomposes into sulfuric acid, phosphoric acid, and hydrogen sulfide. Each of the foregoing materials presents different chemical hazards. Accordingly, the transport of phosphorous pentasulfide is best confined to sealed oxygen-free containers.

Two basic methods heretofore have been used to transport phosphorous pentasulfide. According to one method, phosphorous pentasulfide granules are transported in tote bins typically containing about 300-3000 kilograms (700-6000 pounds) of material. In the other method, phosphorous pentasulfide is transported in about 60 liter (15 gallon) steel pails or drums typically containing about 90 kilograms (200 pounds) of material. Liquid phosphorous pentasulfide is poured into the pails which are then sealed with lids. After several hours at room temperature the molten phosphorous pentasulfide cools to form solid blocks or ingots contained within the steel pails that are set on pallets for handling and transport.

Both of the aforementioned methods have drawbacks. Both methods, for example, require handling of relatively small containers when compared to other material handling systems such as tank cars, hopper cars, tank trucks, etc. Also, the small containers, i.e., the tote bins and pails, are unwieldy and require special handling by forklift trucks. Moreover, the containers require separate labeling to adequately advise workers and emergency personnel of the inherent risks in handling such materials.

The sealed pail method of handling also presents problems in removal and further processing of the solid ingot. To remove the ingot from the steel pail, a common practice has been for a worker to use a air chisel to cut open the pail, after which the drum is then peeled away from the ingot. The solid ingot is then further processed through a grinder or the like to reduce the ingot to granular form for use.

Regardless of which method is used to transport phosphorous pentasulfide material, it is not uncommon for the material to come into contact with the skin of workers during handling of the containers and removal of the phosphorous pentasulfide therefrom. Incidental skin contact may be socially undesirable for the worker. Phosphorous pentasulfide has a tendency to be absorbed into the skin. Vigorous showering with a strong detergent such as Prell TM shampoo has proven helpful in removing phosphorous pentasulfide. However, workers have gone home, and upon perspiring as a result of their engaging in a vigorous activity such as a sport or cutting the lawn, have given off the objectionable odor of hydrogen sulfide. The odor of hydrogen sulfide is akin to that of rotten eggs and the inherent social negatives can be readily appreciated by those who have encountered such odors.

SUMMARY OF THE INVENTION

The present invention provides a system and method for transporting and handling granular material and, in particular, phosphorous pentasulfide granules, in an efficient and safe manner.

According to one aspect of the invention, a system for transporting granular material comprises a hopper for containing the granular material, and an outtake having a vertical leg connected to an outlet opening at the bottom of the hopper and a horizontal leg into which material drops from the hopper through the bottom outlet opening and the vertical leg. A material conveying line connects the downstream end of the horizontal leg of the outtake to a material discharge port through which the material is unloaded from the hopper. A conveying gas supply line connected to the material conveying line upstream of the horizontal leg of the outtake feeds a main flow stream of a conveying gas into the material conveying line for flow across the downstream end of the horizontal leg of the outtake, whereby granular material moving from the outtake into the material conveying line can become entrained in and conveyed by the main flow stream through the conveying line to the material discharge port. The system also comprises a feeder gas supply line connected to the horizontal leg of the outtake upstream of the vertical leg for feeding a stream of feeder gas into the horizontal leg for moving material from the vertical leg into the material conveying line.

The system preferably is embodied in a vehicle and more preferably in a railcar for bulk transport of the material in large quantities approaching, for example, 75,000 kilograms in the case of phosphorous pentasulfide. Moreover, the system permits relatively fast and safe unloading of phosphorous pentasulfide or the like. Whereas one worker could previously empty a tote bin of phosphorous pentasulfide or open about 25 steel pails of phosphorous pentasulfide in about an hour, the system and method of the present invention make it possible for a single worker to unload about 75,000 kilograms of phosphorous pentasulfide in about four hours and with reduced chances of coming into contact with the material.

According to a preferred embodiment of the invention, the vertical leg of the outtake includes a discharge valve for opening and closing the bottom outlet opening of the hopper which has a funnel-shaped bottom wall with the bottom outlet opening located at the lower end of the bottom wall. Preferably the hopper includes a number of hopper sections each having a bottom outlet opening, and an outtake is provided for each bottom outlet opening. The material conveying line includes a common conduit to which each outtake is connected at spaced apart locations along the length of the conduit. The conveying gas supply line includes a conveying gas inlet port and means for selectively connecting the inlet port to opposite ends of the common conduit. The material discharge port is connected to the common conduit between the ends thereof whereby the common conduit has first and second sections at opposite sides of the discharge port. The first and second sections of the common conduit each have at least one outtake connected thereto, and valves are provided in the first and second sections at opposite sides of the discharge port for selectively permitting and blocking flow through the first and second sections, whereby the hopper sections may be sequentially unloaded.

Further in accordance with the preferred embodiment, the feeder gas supply line includes a feeder gas inlet port, a header connected to the gas inlet port, respective branch conduits connecting the header to the outtakes, and valve means in each branch conduit for controlling flow through the branch conduit. Also provided is a blaster for directing a blast of a blaster gas towards the bottom outlet opening of each hopper section from inside the hopper section. The blaster includes a blaster gas inlet port, a blaster header connected to the blaster gas inlet port, respective blaster branch conduits connecting the blaster header to the blasters in the hopper sections, and valves in each blaster branch conduit for controlling flow through the blaster branch conduit.

The hopper preferably is sealed and provision is made for pressurizing the hopper.

According to another aspect of the invention, a system for transporting granular material comprises a hopper including a number of hopper sections each having a bottom outlet, a material conveying conduit, and connecting means for connecting the bottom outlets of the hopper sections to the material conveying conduit at spaced apart locations along the length of the conduit, each connecting means including a valve for opening and closing the bottom outlet of the respective hopper section. The system also comprises means for selectively directing a conveying gas to either end of the material conveying conduit for feeding a main flow stream of a conveying gas into the material conveying conduit for flow in opposite directions, and a discharge port connected to the material handling conduit between the ends thereof, whereby the conduit has first and second sections at opposite sides of the discharge port. First and second valves are provided in the first and second sections at opposite sides of the discharge port for permitting and blocking flow through the first and second sections, whereby the hopper sections may be sequentially unloaded.

According to a further aspect of the invention, a system for transporting granular material comprises a hopper for containing the granular material, a material discharge port through which material is unloaded from the hopper, a material conveying line connected to a bottom outlet of the hopper, a conveying gas supply line connected to the material conveying line upstream of the bottom outlet for feeding a main flow stream of a conveying gas into the material conveying line for flow across the bottom outlet, whereby granular material moving from the outlet into the material conveying line can become entrained in and conveyed by a main flow stream through the conveying line to the material discharge port, a blaster nozzle located inside the hopper for directing a blast of a blaster gas downwardly towards the bottom outlet of the hopper, and separate conveying gas supply lines for supplying a stream of blaster gas to the blaster nozzle.

According to yet another aspect of the invention, a hopper assembly for granular material comprises a hopper, an inlet port at the top of the hopper for loading of the granular material into the hopper, and a material distributor centered and spaced beneath the inlet port for distributing material falling from the inlet port radially within the hopper. The distributor has a top surface including an upper conical central portion and a conical skirt portion, the lower conical skirt portion having an angle of inclination relative to horizontal less than that of the upper conical central portion. In a preferred embodiment, the angle of inclination of the upper conical central portion is in the range of about 20 to 50 degrees, and the angle of inclination of the lower conical skirt portion is in the range of about 10 to 30 degrees. More particularly, the angle of inclination of the upper conical central portion is about 35 degrees, and the angle of inclination of the lower conical skirt portion is about 20 degrees. In addition, the distributor preferably has a base diameter about 2 to 4 times greater than the diameter of the inlet port and the lower conical skirt portion projects radially beyond the upper conical central portion by about ¼ to 1/6 the radius of the base of the upper conical central portion.

According to another aspect of the invention, a method of unloading a granular material from a hopper comprises the steps of (a) opening a valve in the vertical leg of an outtake connected to a bottom opening of the hopper to allow material to flow into a horizontal leg of the outtake, (b) directing a main flow stream of a conveying gas into a material conveying line connected to an outlet end of the horizontal leg of the outtake for flow across the outlet end, whereby granular material moving from the outtake into the material conveying line can become entrained in and conveyed by the main flow stream through the conveying line to a material discharge port, and (c) feeding a stream of a feeder gas into the horizontal leg of the outtake upstream of the vertical leg for moving material in the horizontal leg into the material conveying line. Preferably, the flow of the feeder gas into the outtake is controlled to vary the rate of discharge of material from the hopper.

According to a further aspect of the invention, a method of transporting granular material comprises the steps of (a) loading the material into a hopper in a vehicle at a loading facility, (b) moving the vehicle to an unloading facility, (c) opening a valve in the vertical leg of an outtake connected to a bottom opening of the hopper to allow material to flow into a horizontal leg of the outtake, (d) directing a main flow stream of a conveying gas into a material conveying line connected to an outlet end of the horizontal leg of the outtake for flow across the outlet end, whereby granular material moving from the outtake into the material conveying line can become entrained in and conveyed by the main flow stream through the conveying line to a material discharge port, and (e) feeding a stream of a feeder gas into the horizontal leg of the outtake upstream of the vertical leg for moving material in the horizontal leg into the material conveying line.

When the method of the invention is practiced to transport and/or handle phosphorous pentasulfide and like materials, the material preferably has a particle size distribution such that substantially all of the particles are less than 2.54 cm (1 inch); 0.1 to 15% by weight of the particles passing through a 1.9 cm (¾ inch) screen; 10 to 100% by weight of the particles passing through a 0.238 cm (0.0937 inch) screen; 20 to 100% weight of the particles passing through a 0.042 cm (0.0139 inch) screen; and 50 to 100% weight of the particles passing through a 0.0149 cm (0.0059 inch) screen. More preferably, the material has a particle size distribution such that substantially all of the particles are less than 1.9 cm (¾ inch); 15 to 100% by weight of the particles passing through a 0.238 cm (0.0937 inch) screen; 30 to 100% by weight of the particles passing through a 0.042 cm (0.0139 inch) screen; and 60 to 100% by weight of the particles passing through a 0.0149 cm (0.0059 inch) screen.

In general, the invention comprises the foregoing and other features hereinafter fully described and particularly pointed in the claims, the following description and the annexed drawings setting forth in detail a certain illustrated embodiment of the invention, this being indicative, however, of but one of the various ways in which the principles of the invention may be employed.

BRIEF DESCRIPTION OF THE DRAWINGS

In the annexed drawings,

FIG. 4 is a top plan view of the distributor of FIG. 3, looking from the line 4—4 of FIG. 3;

FIG. 5 is a sectional view showing a support arrangement for a discharge piping system employed in the hopper car, as taken substantially along the line 5—5 of FIG. 1;

FIG. 6 is an elevational view of the discharge piping system, showing material conveying and conveying gas supply lines, looking from the line 6—6 of FIG. 5;

FIG. 7 is a top plan view of the discharge piping system of FIG. 6, looking from the line 7—7 of FIG. 6, with the conveying gas supply line omitted for illustration purposes;

FIG. 8 is a top plan view of a blaster supply line included in the discharge piping system;

FIG. 9 is a top plan view of the conveying gas supply line; and

DETAILED DESCRIPTION

Figure 1:
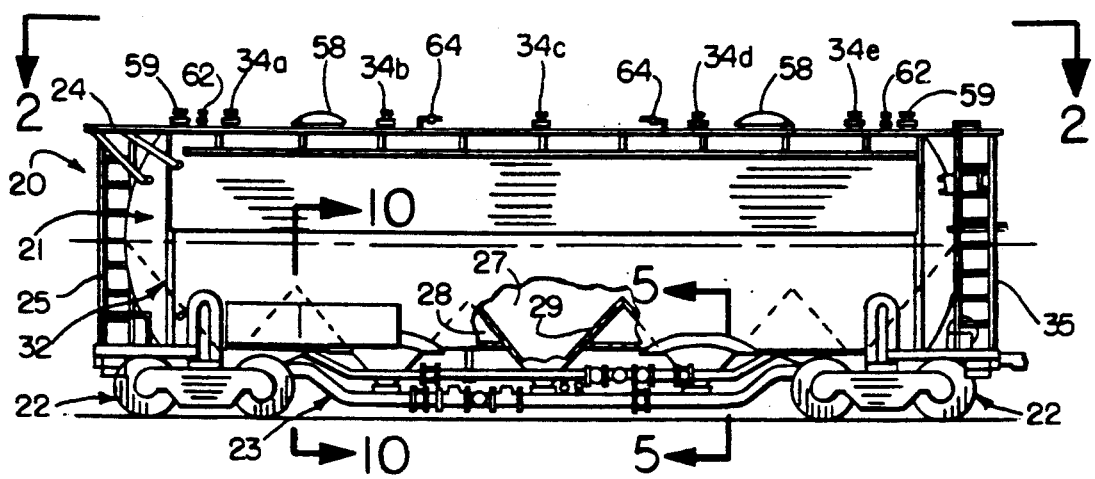
FIG. 1 is an elevational view of a hopper car according to a preferred embodiment of the invention.
Figure 2:
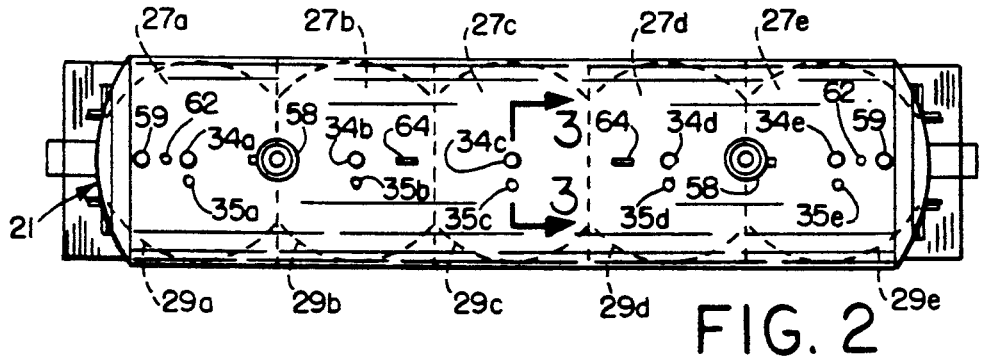
FIG. 2 is a top plan view of the hopper car of FIG. 1, looking from the line 2—2 of FIG. 1.

Referring now in detail to the drawings and initially to FIGS. 1 and 2, a preferred embodiment of a material transport and handling system according to the invention can be seen to include a railcar indicated generally at 20. The railcar 20 may be utilized to transport granular material and, in particular, phosphorous pentasulfide granules or like material. Although the various features and principles of the invention will be described in relation to the illustrated railcar, it will be appreciated by those skilled in the art that one or more features or principles of the invention may be used in other forms of transport and/or handling systems such as, for example, in a tank truck for highway transport. However, the preferred mode of transport according to the invention is by rail.

The illustrated railcar 20 is in the form of a conventional tank car that has been modified in the hereinafter described manner. Like a conventional tank car, the railcar 20 comprises a closed-ended cylindrical tank 21 which is supported at its ends atop wheel assemblies 22. In the illustrated railcar, the wheel assemblies 22 are locked to the cylindrical tank 21 against separation in the event of a derailment of the railcar. Locking the wheel assemblies to the tank reduces the possibility that a discharge piping system 23 located beneath the cylindrical tank could be raked over the ground or other obstruction in the event of a derailment. The discharge piping system 23 is hereinafter described and more clearly shown in FIGS. 5-10. The railcar 20 may be further conventionally outfitted with a catwalk 24 and ladders 25 as shown in FIG. 1.

The interior of the cylindrical tank 23 is divided into an upper hopper 27 and a lower dead space 28 by a wall structure composed of a row of funnel-shaped walls 29. The upper edges of the funnel-shaped walls are joined as by welding to the sides of the cylindrical tank and to one another to define the bottom of the hopper 27. More particularly, the funnel-shaped walls indicated at 29a-29e in FIG. 2 form the bottom walls of respective hopper sections 27a-27e. The hopper may have a capacity on the order of 79-99 cubic meters (2800-3500 cubic feet) and may be loaded in the hereinafter described manner with quantities of phosphorous pentasulfide approaching 75,000 kilograms, as opposed to tote bins which at most handled about 3000 kilograms.

Each bottom wall 29a-29e has a lower portion which projects downwardly below the bottom of the cylindrical tank 21 as seen in FIG. 1. Because of the wheel assemblies 22 located below the ends of the cylindrical tank 21, the bottom walls of the endmost hopper sections 27a and 27e do not project below the bottom of the tank to the same extent as the bottom walls of the three intermediate hopper sections 27b-27d.

Provision may be made to monitor the interior dead space 28 for detection of gases that may be emitted by material carried in the hoppers 27. When transporting phosphorous pentasulfide, for example, the dead space 28 may be monitored for detection of hydrogen sulfide gas. Since no phosphorous pentasulfide is allowed to enter the dead space 28, the presence of hydrogen sulfide gas in such space could mean that a leak has occurred in the system. Early detection of a leak is desirable so that appropriate corrective action may be promptly undertaken. Otherwise, undesirable concentrations of hydrogen sulfide gas may develop within and outside the hopper 27. Also, the presence of hydrogen sulfide indicates that sulfuric and phosphoric acids are also being produced by the decomposition of phosphorous pentasulfide. These acids may attack the walls of the hopper which for strength and economy will typically be made of steel.

When used to transport phosphorous pentasulfide, or similar materials, the hopper 27 preferably is pressurized using an inert gas such as nitrogen or carbon dioxide. To this end, the railcar may be equipped with a supply of inert gas which may consist of one or more tanks of a compressed inert gas stored in a compartment 32 at one side of the cylindrical tank 21. Appropriate plumbing may be provided to maintain a vapor space purge. That is, the inert gas may be supplied from the storage tanks to the interior of the airtight hopper to fill the vapor space in the hopper and also to pressurize the hopper, it being noted that only a relatively small amount of nitrogen or other inert gas is needed to blanket and protect the phosphorous pentasulfide or other material for transport. In the event of a minor leak, the pressurized inert gas will prevent outside air and/or moisture from entering the hopper and reacting with the phosphorous pentasulfide. By way of the example, the hopper may be maintained at a pressure in the range of about 71 Kpa (about 10 PSIG).

In the illustrated railcar, the hopper sections 27a-27e are arranged in a row extending along the longitudinal axis of the railcar. The upper portions of the hopper sections may be open to one another as shown. Alternatively, walls may be provided interiorly of the tank to separate the hopper sections into individually sealed compartments.

The hopper sections 27a-e have at their upper ends respective inlet port assemblies 34a-34e through which material may be loaded into the hopper. Each inlet port assembly preferably has its inlet opening or port centered above the corresponding funnel-shaped bottom wall of the corresponding hopper section and preferably coaxial with an outlet port or opening in the bottom wall. The inlet port assemblies for the hoppers are disposed in a row extending along the longitudinal axis of the rail car as best shown in FIG. 2. Each inlet port assembly 34a-34e may have associated therewith a respective level detector assembly 35a-35e for monitoring the height of material loaded into the hopper at each hopper section.

Figure 3:
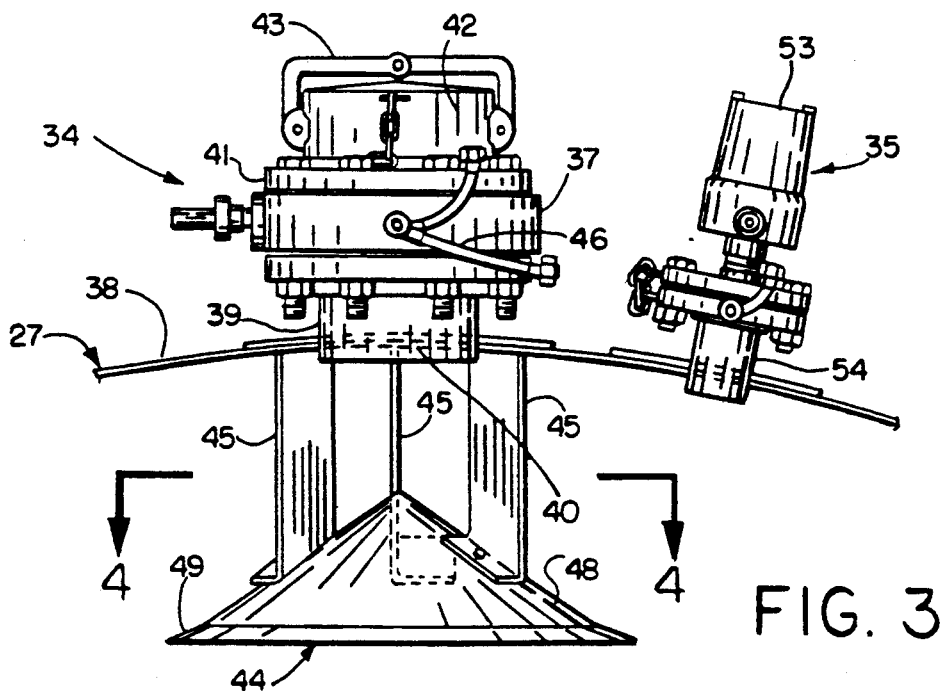
FIG. 3 is a fragmentary sectional view showing a representative hopper inlet assembly including a material distributor, as taken along the line 3—3 of FIG. 2.

In FIG. 3, a representative inlet port assembly 34 and a representative level detector assembly 35 are shown in greater detail. The inlet port assembly 34 includes a valve 37 mounted to the top wall 38 of the hopper 27 by a cylindrical nozzle tube 39. The valve and nozzle tube together form an inlet port or opening 40 through which material may be loaded into the hopper. After loading the valve may be closed to provide an airtight closure preventing air from entering the hopper through the inlet port assembly. The valve has mounted thereto a quick coupling 41 which provides for easy and quick connection to a loading hose, tube, or the like. When not in use, the quick disconnect coupling may have coupled thereto a quick disconnect dust cap 42 provided with a locking handle 43. Grounding straps 46 may be provided as shown. Although no further mention will be made of grounding straps, they may be provided throughout the system as is conventional and good practice in potentially explosive environments.

A material distributor 44 is mounted inside the hopper beneath and coaxial with the inlet port 40. In the illustrated embodiment the distributor is suspended from the top wall 38 of the hopper 27 by three brackets 45 welded to the distributor and top wall of the tank. The distributor and supporting hardware preferably are made of stainless steel.

The distributor 44 serves to deflect material dropping from the inlet port 40 radially outwardly to provide for more even distribution of material in the hopper thereby to maximize the volume of material that can be loaded into the hopper 27. To this end the top surface of the distributor is uniquely shaped and can be seen in FIGS. 3 and 4 to have an upper conical central portion 48 and a conical skirt or flange portion 49. The lower conical skirt portion 49 has an angle of inclination (relative to horizontal) less than that of the upper conical central portion 48 to enhance the distribution pattern of the distributor.

The angle of inclination of the upper conical central portion preferably is in the range of about 20 to 50 degrees, more preferably in the range of about 30 to 40 degrees, and still more preferably about 35 degrees; whereas the angle of inclination of the lower conical skirt portion preferably is in the range of about 10 to 30 degrees, more preferably in the range of about 15 to 25 degrees, and still more preferably about 20 degrees. The overall height of the distributor is preferably about equal to the diameter of the inlet port and the apex of the distributor is spaced below the inlet port by a distance preferably about equal to the diameter of the inlet port. Also, the distributor has a base diameter about 2 to 4 times greater than the diameter of the inlet port and more preferably about 3 times greater; and the lower conical skirt portion projects radially beyond the upper conical central portion by about ⅛ to 1/6 the radius of the base of the upper conical central portion and more preferably by about 1/5.

As seen at the right in FIG. 3, the level detector assembly 35 includes a level detector device 53 which, for example, may be a Drexelbrook #700-202-23 point level control. The level detector device 53 is mounted to the top wall 38 of the hopper 27 by a nozzle tube 54 that is open to the interior of the hopper.

Reverting to FIGS. 1 and 2, the railcar 20 is provided at the top of the tank 21 with one or more manhole and hatch assemblies 58. Also provided at each end of the tank are vent port assemblies 59 which may be used, for example, for purging the hopper. An inert gas such as carbon dioxide may be injected through the vent port assembly at one end of the tank and exhausted from the vent port assembly at the opposite end of the tank for purging the hoppers of any air, moisture, or the like. The vent port assemblies may also be used for venting gas displaced from the hopper 27 during loading of the hopper with the granular material to be transported. The vent port assemblies may be the same as the inlet port assembly illustrated in FIG. 3.

The top of the tank may also be provided with one or more gas probe port assemblies 62. In the illustrated embodiment, two such assemblies are provided at opposite ends of the tank adjacent the vent port assemblies 59. Each gas probe port assembly may include, for example, a valve that may be opened to permit insertion of a gas probe into the interior of the hopper 27 as may be desired for detecting the presence of gases such as hydrogen sulfide gas when the railcar is used to transport phosphorous pentasulfide. Such testing may be undertaken during loading or unloading of the hopper. If desired, a permanent probe may be used in which case monitoring could take place at all times such as even during transport. The gas probe port assembly may be mounted to the tank in substantially the same manner as the level detector assembly 35, except with a valve replacing the detector unit 53. As may be desired, a plug may be used to close the outer end of the gas probe port assembly when not in use.

Still referring to FIGS. 1 and 2, the hopper 27 also is provided with one or more pressure relief valves 64. The pressure relief valves are mounted atop the tank 21 and protect against development of excessive pressure inside the hopper.

Figure 10:
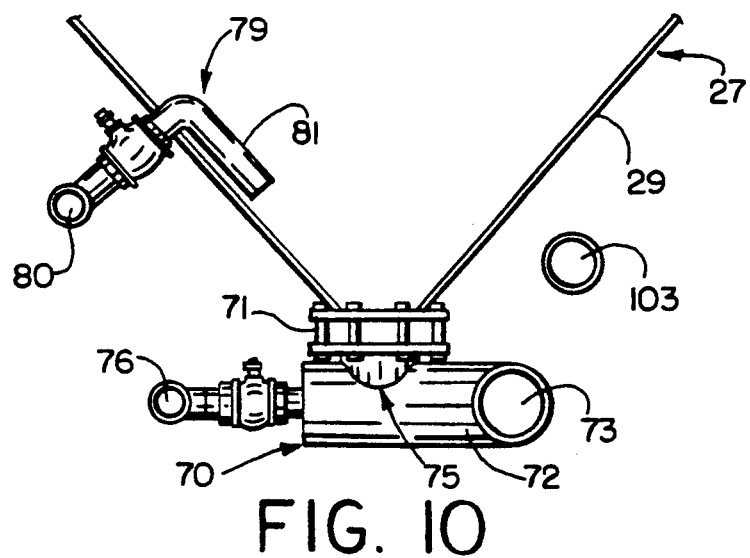
FIG. 10 is a fragmentary sectional view taken along the line 10—10 of FIG. 1, showing a representative blaster arrangement included in the discharge piping system.

Referring now to FIGS. 5-10, the above mentioned discharge piping system 23 includes an outtake 70a-70e connected to the bottom outlet opening in the lower end of each funnel-shaped bottom wall 29. A representative outtake 70 is illustrated in FIG. 10 where it can be seen that the outtake in the illustrated embodiment is generally L-shape. The outtake has a vertical leg 71 connected to the bottom outlet opening in the hopper bottom wall 29 and a horizontal leg 72 connected at its downstream outlet end to a material conveying line 73. The vertical leg 71 includes a hopper discharge butterfly valve 75 for opening and closing the bottom outlet opening of the hopper. When the valve is open, granular material in hopper will flow by gravity into the horizontal leg of the outtake.

The material falling from the hopper 27 into the horizontal leg 72 of the outtake 70 is fed or, perhaps more aptly, blown by a feeder gas through the horizontal leg 5 and into the material conveying line 73. A stream of feeder gas is fed into the horizontal leg of the outtake upstream of the vertical leg 71 by a feeder gas supply line 76.

Before leaving FIG. 10, the discharge piping system 23 further includes a blaster 79 to which a stream of a blaster gas may be supplied by a blaster gas supply line 80 as needed to break up or dislodge material clogging and hence blocking the hopper outlet opening. The blaster 79 has a nozzle 81 located inside the hopper and aimed downwardly toward the hopper outlet opening for directing the stream of blaster gas at the hopper outlet opening.

Referring now to FIGS. 6 and 7, the material conveying line 73 includes a common conduit 85 to which the each outtake 70 is connected at spaced apart locations along the conduit which extends generally parallel to the longitudinal axis of the railcar. More particularly, the conduit 85 has a central portion 86 laterally offset from a vertical center plane through the railcar along which the hopper bottom outlet openings 87a-87e are aligned in a row. The central portion 86 also is at about the same elevation as the horizontal legs of the intermediate outtakes 70b-70d. At each end of the central portion 86 the conduit has upwardly sloped and inwardly angled intermediate portions 88 which extend to horizontal end portions 89 to which the endmost outtakes 70a and 70e are connected. The end portions 89 are at about the same elevation as the horizontal legs of the endmost outtakes. Unlike the central portion 86 which extends perpendicular to the horizontal legs of the outtakes 70b-70d, the end portions 89 are in line with the horizontal legs of the outtakes 70a and 70e. In fact, the horizontal legs of the outtakes 70a and 70e may be formed by end continuations of the conduit 85.

A material discharge port 93 is connected to the conduit 85 between the ends thereof and more particularly between the outtakes 70b and 70c as shown. The discharge port is adapted for coupling to an unloading line at an unloading facility which may include a silo or other vessel to receive the material unloaded from the car. When not in use, a dust cap 94 may be installed on the discharge port to protect the same.

In the illustrated embodiment the material discharge port 93 is connected into the conduit directly between two flow control valves 96 and 97. With this arrangement the conduit has, as viewed in FIGS. 6 and 7, left and right sections 98 and 99 on opposite sides of the discharge port with the valves 96 and 97 being operable to selectively permit or block flow through the left and right sections, respectively.

Referring now to FIGS. 6 and 7, a material conveying gas is selectively supplied to the ends of the conduit 85 by a conveying gas supply line 103. The conveying gas supply line 103 includes a conveying gas inlet port 104 conveniently located on the same side of the railcar as the discharge port 93. The conveying gas inlet port is adapted for coupling to a conveying gas supply line at the unloading facility. When not in use, a dust cap 105 may be installed on the port 104 to protect the same.

The inlet port 104 is connected by flow control valves 108 and 109 to left and right conduit sections 110 and 111, respectively. The conduit sections are located above and generally follow the coextending portions of the material conveying conduit 85 for connection to the ends of the conduit 85. The ends of the conduit sections turn downwardly at 77 for connection to the conduit 85 at the downstream ends of the horizontal legs of the endmost outtakes 70a and 70e for feeding a main flow stream of conveying gas into the conduit 85 for flow across the downstream end of the horizontal leg of the endmost outtakes. Of course, the main flow stream flowing from the ends of the conduit 85 towards the discharge port 93 will flow across the downstream ends of the horizontal legs of the intermediate outtakes 70b-70d.

Through selective opening and closing of the valves 96, 97, 108, and 109, a main flow stream of a conveying gas may be directed across the downstream end of any one of the outtakes. This creates a venturi-like effect that will cause material to be drawn into the conduit 85 from any selected outtake for entrainment in the main flow stream and conveyance to the discharge port and the material receiving line connected thereto. Of course, the silo or other container into which the material is unloaded necessarily must be at a pressure lower than the pressure at the discharge port for proper flow to exist.

Although one or more of the hopper sections could be unloaded at the same time, preferably, to minimize the possibility of a blockage occurring in the material conveying passages, only one hopper section is unloaded at one time and the gas flow received at the gas inlet port 104 is directed entirely across the downstream end of the outtake corresponding to the hopper section being unloaded. Accordingly, the valves 96 and 108 are closed and the valves 97 and 109 are opened for unloading from hopper sections 27c-27e, and conversely the valves 96 and 108 are opened and the valves 97 and 109 are closed for unloading from hopper sections 27a and 27b. It will be appreciated that in either case flow might be temporarily reversed as may be necessary to dislodge material that has come to block one of the flow passages.

Although the venturi-like effect caused by main stream flow across the outlet end of the outtake 72 will tend to draw material into the conveying line 73 for subsequent passage therealong, flow of material into the conveying line is primarily controlled by the flow of the feeder gas fed into the outtake by the feeder gas supply line 76. As seen in FIG. 7, the feeder gas supply line 76 has a feeder gas inlet port 115 conveniently located on the same side of the railcar as the discharge port 93. The feeder gas inlet port may include a quick disconnect coupling for connection to a feeder gas supply line at the unloading facility.

The feeder gas supply port is connected to a header or manifold 117 which in turn is connected by respective branch conduits 118a-118e to the outtakes 70a-70e. The branch conduits 118a-118e include respective flow control valves 119a-119e which may be opened and closed to selectively supply a flow of feeder gas from the manifold to any one of the outtakes upstream of the vertical leg 71 of the outtake. When unloading one hopper section at a time, normally only one of the feeder flow control valves will be open and the rest closed thereby to direct the entire flow of feeder gas into the outtake for the hopper section being unloaded. The feeder gas manifold is also connected to the interior of the hopper via a vent tube 121 that extends upwardly in and close to the top of the hopper. The vent tube equalizes the pressure in the hopper to the pressure of the feeder gas being supplied to the outtake of the hopper section being unloaded to promote free flow by gravity of material from the hopper section into the outtake.

The feeder gas pressure, and correspondingly the feeder gas flow rate, has been found to directly affect the rate at which material is removed from the hopper section being unloaded. The material flow rate may be increased by increasing the feeder gas pressure (flow rate) and the material flow rate may be reduced by decreasing the feeder gas pressure (flow rate). During unloading the pressure in the conveying gas supply line upstream of the material conveying line preferably is monitored to provide feedback for controlling the pressure of the feeder gas. If material is being fed into the conveying line at too high a rate that might present a clogging or other problem, back pressure will develop in the conveying gas supply line. Upon the back pressure reaching a level determined to be undesirable for the given system and application, the feeder gas supply may temporarily stopped or the pressure thereof lowered until the back pressure drops to an acceptable level. This system control operation may be automated if desired with the feeder gas pressure and/or flow being controlled automatically in response to feedback provided a pressure sensor connected to the feeder gas supply line.

Referring now to FIG. 8, the blaster gas supply line 80 has a blaster gas inlet port 122 conveniently located on the same side of the railcar as the discharge port 93 adjacent the feeder gas supply inlet port 115 as seen in FIG. 6. The blaster gas inlet port may include a quick disconnect coupling for connection to a blaster gas supply line at the unloading facility.

The blaster gas supply port 122 is connected to a header or manifold 123 which in turn is connected by respective branch conduits 124a-124e to the blaster nozzles 81a-81e located inside the hopper sections. The branch conduits 124a-124e include respective flow control valves 125a-125e which may be opened and closed to selectively supply a flow of blaster gas from the manifold to any one or more of the blaster nozzles.

The above referred to conveying, feeder, and blaster gases preferably are all the same gas and preferably an inert gas, i.e., any gas that does not chemically react with the material being transported in the railcar. In the case of phosphorous pentasulfide, inert gases include nitrogen and carbon dioxide, with the latter being preferred.

In the illustrated railcar the hopper outlet openings, outtakes, and material conveying line components have about 15 cm (6 inch) diameter flow passages; the conveying gas supply line components have about 10 cm (4 inch) diameter flow passages; and the feeder and blaster gas supply line components have about 7 cm (3 inch) diameter flow passages, except that the blaster branch conduits are about 5 cm (2 inch) diameter. The unloading terminal may be equipped with material discharge and gas supply hoses and/or lines of corresponding diameters.

The discharge piping system may be supported beneath the tank 21 in any suitable manner, as with the aid of a fabricated frame structure 132 shown in FIG. 5. The frame structure and the conveying lines 73 and 76 at the underside thereof may be strengthened such that they function as a skid guard to protect against the bottoms of the hoppers from being ripped open in the event of a derailment. As seen in FIG. 1, the upwardly angled portions of the material conveying conduit 85 will aid in the functioning of such conduit as a skid guard, regardless of the direction in which the railcar is moving. This same feature may also be used on a tractor trailer.

Although various aspects of loading and unloading of the railcar have already been discussed above, a loading and unloading operation will now be described. At a loading terminal, granular material is loaded into the hopper 27 through one or more of the hopper inlet ports 34 atop the tank 21. In the case of phosphorous pentasulfide or like material, the hopper is first purged of air and moisture, or any other gas, liquid, or solid material that may react with the material to be loaded into the hopper. The hopper sections then are loaded under inert atmosphere conditions one at a time starting from one end of the hopper. After the hopper has been filled, the hopper inlet ports are closed and the vapor space purge effected to maintain the hopper pressurized with inert gas, such as nitrogen gas, during transit.

At the unloading terminal, the discharge piping system preferably is purged before off-loading any material in the event that air may have entered the piping system during transit. Using carbon dioxide or other inert gas as the purge gas, the blaster gas header may first be purged by flowing the purge gas therethrough until the oxygen level drops, for example, below 2% in the expelled gas. Next the feeder gas, conveying gas, and material conveying manifolds may be similarly purged. If the vapor space purge was found not to be operating properly, purge gas may be supplied to the vapor space purge lines and vented out through the vent port assemblies 59 that may be connected to a vent header in the unloading terminal, thereby to purge the hopper. Preferably the hopper is purged before purging the various manifolds of the discharge piping assembly.

With the material discharge port and gas inlet ports connected to corresponding hoses or pipes of the unloading terminal, the hopper sections may be sequentially unloaded starting preferably at one end and moving to the other end of the hopper. To first unload the hopper section 27e, the valves 96 and 108 are closed. Conveying gas is then supplied to the inlet port 105 at a pressure of about 70 Kpa (10 PSIG) for the illustrated system to establish a main flow stream across the outlet end of the outtake 70e for the hopper section 27e, such stream having, for example, a conveying velocity of about 40 m/sec (120 feet/sec). The valve 71 in the vertical leg of the outtake 70e may then be opened to allow material to flow from the hopper into the horizontal leg of the outtake. Feeder gas may then be supplied to the inlet port 115 initially at about 50 KPa (7 PSIG) and the valve 119e opened to flow feeder gas into the horizontal leg of the outtake to urge the material dropping from the hopper into the conveying conduit 85 where the material becomes entrained in the main flow stream which carries the material along the material conveying conduit and out through the discharge port 93 to a silo or other vessel maintained preferably at about 15 KPa (2 PSIG). After initial flow has been established, the feeder supply pressure may be slowly increased to about 60 KPa (8.5 PSIG) to obtain a flow rate of about 17 cubic meters/minute (600 CFM). This continues until the first hopper section is unloaded, after which the valves are adjusted as needed to redirect flow for unloading the next hopper section in the same manner, and so on for the remaining hopper sections. If a hopper outlet becomes plugged the blaster may be used to dislodge the plug. After all of the hoppers have been unloaded, preferably the unloading procedure is repeated for each hopper to ensure that the railcar is completely empty.

As mentioned above, the present system and associated methodology are devised primarily to transport hazardous dry granular material and particularly granules of phosphorous pentasulfide. The phosphorous pentasulfide or similar material preferably has a particle size distribution such that substantially all of the particles are less than 2.54 cm (1 inch); 0.1 to 15% by weight of the particles passing through a 1.9 cm (¾ inch) screen; 10 to 100% by weight of the particles passing through a 0.238 cm (0.0937 inch) screen; 20 to 100% by weight of the particles passing through a 0.042 cm (0.0139 inch) screen; 50 to 100% by weight of the particles passing through a 0.0149 cm (0.0059 inch) screen. More preferably, the material has a particle size distribution such that substantially all of the particles are less than 1.9 cm (¾ inch); 15 to 100% by weight of the particles passing through a 0.238 cm (0.0937 inch) screen; 30 to 100% by weight of the particles passing through a 0.042 cm (0.0139 inch) screen; 60 to 100% by weight of the particles passing through a 0.0149 cm (0.0059 inch) screen.

Still more preferably, the material has a particle size distribution such that 20 to 100% by weight of the particles passing through a 0.238 cm (0.0937 inch) screen; 40 to 100% by weight of the particles passing through a 0.042 cm (0.0139 inch) screen; 70 to 100% by weight of the particles passing through a 0.0149 cm (0.0059 inch) screen. More particularly, the material has a particle size distribution such that at least 25% by weight of the particles are greater than 0.0053 cm (0.0021 inch) and still more particularly a particle size distribution such that at least 35% by weight of the particles are greater than 0.0074 cm (0.0029 inch).

Although the invention has been shown and described with respect to a preferred embodiment, it is obvious that equivalent alterations and modifications will occur to other skilled in the art upon the reading and understanding of this specification. The present invention includes all such equivalent alterations and modifications, and is limited only by the scope of the following claims.

What is claimed is:

1. A system for transporting granular material comprising
a hopper for containing the granular material, said hopper having a bottom outlet opening;
a material discharge port through which the granular material is unloaded from said hopper;
an outtake having a vertical leg connected to said bottom outlet opening and a horizontal leg into which the granular material drops from said hopper through said bottom outlet opening and said vertical leg;
a material conveying line connecting a downstream end of said horizontal leg of said outtake to said material discharge port;
a conveying gas supply line connected to said material conveying line upstream of said horizontal leg of said outtake for feeding a main flow stream of a conveying gas into said material conveying line for flow across said downstream end of said horizontal leg of said outtake, whereby the granular material moving from said outtake into said material conveying line can become entrained in and conveyed by the main flow stream through said conveying line to said material discharge port; and
a feeder gas supply line connected to an upstream end of said horizontal leg of said outtake for feeding a stream of feeder gas into said horizontal leg for moving the granular material from said vertical leg into said material conveying line.

2. A system as set forth in claim 1, wherein said vertical leg of said outtake includes a discharge valve for opening and closing said bottom outlet opening.

3. A system as set forth in claim 1, wherein said hopper has a funnel-shaped bottom wall with said bottom outlet opening located at a lower end of said bottom wall.

4. A system as set forth in claim 1, wherein said hopper includes a plurality of hopper sections each having a bottom outlet opening, an outtake is provided for each said bottom outlet opening of said plurality of hopper sections, and said material conveying line includes a common conduit to which each said outtake is connected at spaced apart locations along a length of said conduit.

5. A system as set forth in claim 4, wherein said conveying gas supply line includes a conveying gas inlet port and means for selectively connecting said inlet port to opposite ends of said common conduit.

6. A system as set forth in claim 5, wherein said means for selectively connecting includes a pair of branch conduits connected between said inlet port and the ends of said common conduit, and respective valves in said branch conduits for permitting or blocking flow of the conveying gas through said branch conduits.

7. A system as set forth in claim 5, wherein said material discharge port is connected to said common conduit between the ends thereof whereby said common conduit has first and second sections at opposite sides of said discharge port, said first and second sections of said common conduit each have at least one of the outtakes connected thereto, and valve means are provided in said first and second sections at the opposite sides of said discharge port for selectively permitting and blocking flow through said first and second sections, whereby said hopper sections may be sequentially unloaded.

8. A system as set forth in claim 4, wherein said plurality of hopper sections include intermediate and endmost hopper sections, said outtakes corresponding to the intermediate hopper sections have the horizontal legs thereof extending generally perpendicular to said common conduit, and said outtakes corresponding to the endmost hopper sections have the horizontal legs thereof extending generally parallel to said common conduit.

9. A system as set forth in claim 4, wherein said feeder gas supply line includes a feeder gas inlet port and means for selectively connecting said feeder gas inlet port to each said outtake.

10. A system as set forth in claim 9, wherein said means for selectively connecting said feeder gas inlet port includes a header connected to said gas inlet port, respective branch conduits connecting said header to said outtakes, and valve means in each branch conduit for controlling flow through the respective branch conduit.

11. A system as set forth in claim 4, further comprising blaster means for directing a blast of a blaster gas towards the bottom outlet opening of each hopper section from inside each respective hopper section.

12. A system as set forth in claim 11, wherein said blaster means includes a blaster gas inlet port and means for selectively connecting said blaster gas inlet port to the blaster means for each said hopper section.

13. A system as set forth in claim 12, wherein said means for selectively connecting said blaster gas inlet port includes a blaster header connected to said blaster gas inlet port, respective blaster branch conduits connecting said blaster header to the blaster means in said hopper sections, and valve means in each blaster branch conduit for controlling flow through each blaster branch conduit.

14. A system as set forth in claim 1, wherein said hopper is sealed.

15. A system as set forth in claim 14, further including means for pressurizing said hopper.

16. A system as set forth in claim 1, which system is mobile.

17. A system as set forth in claim 16, which system is a railway car.

* * * * *